W. W. WHITTON.
AUTOMOBILE CONSTRUCTION AND ATTACHMENT.
APPLICATION FILED JAN. 21, 1920.

1,403,881.

Patented Jan. 17, 1922.

Witness
J. B. Gardner

INVENTOR
W. W. WHITTON
BY White Prost
his ATTORNEYS

UNITED STATES PATENT OFFICE.

WILLIAM W. WHITTON, OF OAKLAND, CALIFORNIA.

AUTOMOBILE CONSTRUCTION AND ATTACHMENT.

1,403,881.     Specification of Letters Patent.     Patented Jan. 17, 1922.

Application filed January 21, 1920. Serial No. 352,955.

*To all whom it may concern:*

Be it known that I, WILLIAM W. WHITTON, a citizen of the United States, and a resident of Oakland, county of Alameda, and State of California, have invented a new and useful Automobile Construction and Attachment, of which the following is a specification.

My invention relates to the arrangement and structural cooperation of a spare tire carrier or the like with respect to the frame members of an automobile.

An object of the invention is to provide a spare tire carrier which not only acts to protect the tire from the elements and dirt, but aids materially in reinforcing the frame structure of the automobile.

Another object of the invention is to provide a spare tire carrier or case which is unobstrusive and renders the tire easily accessible.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Figure 1:
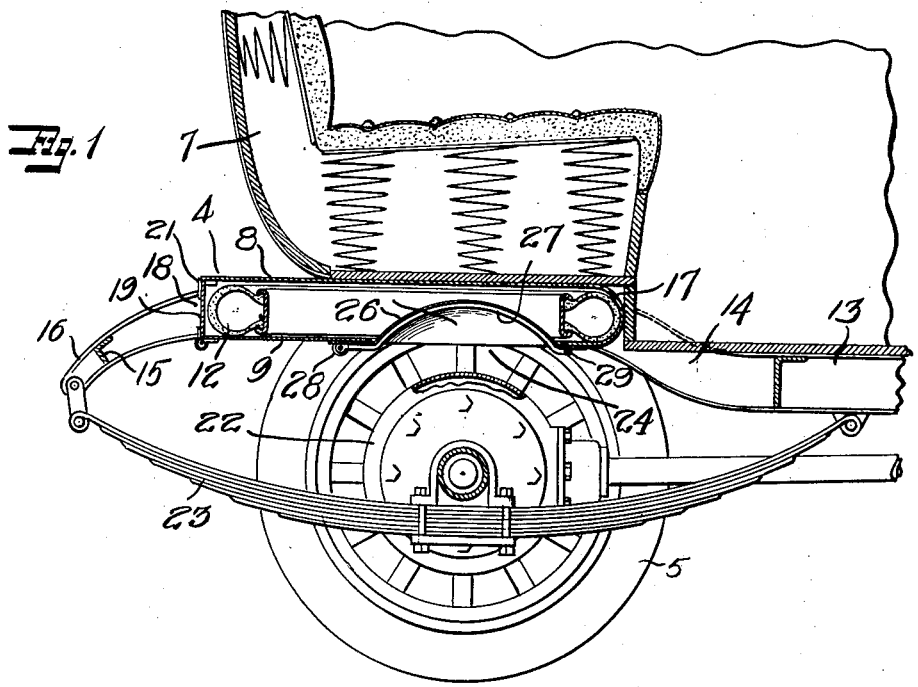
Fig. 1 is a vertical sectional view of the rear end of an automobile constructed and equipped in accordance with my invention.
Figure 2:
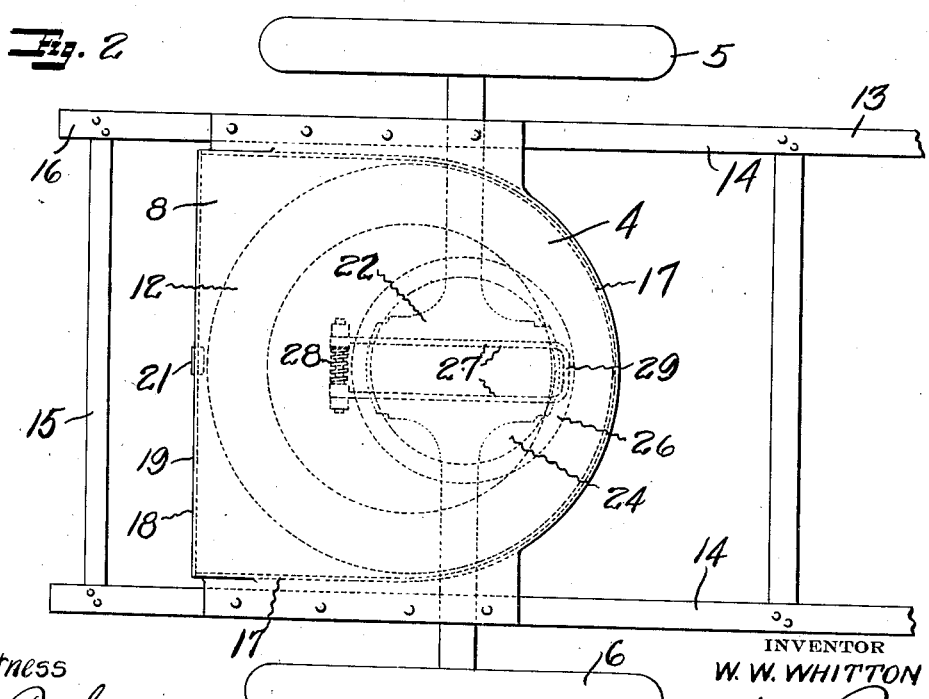
Fig. 2 is a plan view of the apparatus shown in Fig. 1, the body of the automobile being removed.

Briefly expressed my invention comprises a spare tire case which is arranged between the rear wheels and below the body of the automobile. The case is designed so as to enter into structural cooperation with the automobile frame and add strength thereto. The case is further designed to permit the full play of the body of the automobile with relation to the running gear thereof when the vehicle springs are functioning.

A detailed description of the present form of my invention follows:

The spare tire case 4 of my invention is arranged between the rear wheels 5 and 6 of the automobile and underneath the body 7 thereof. The case comprises top and bottom plates 8 and 9 between which a spare tire 12 may be disposed so as to lie in a substantially horizontal position. In order to reinforce the automobile frame 13, either one or both of the plates 8 and 9 may be attached to the longitudinal frame members 14, and as here shown the top plate 8 is riveted or otherwise secured at its opposite ends to the members 14 so that a very effective cross brace is provided at this portion of the frame. The usual cross member 15 which is generally provided at the rear of the frame is in the present instance arranged well down in the gooseneck 16 of the longitudinals in order that it will not interfere with the tire when the latter is placed into or removed from the case. The case is also formed with suitable side walls 17 which extend from one plate to the other, an opening 18 however being provided at the rear end of the case through which the tire may be readily inserted into or withdrawn from the case when desirable. The opening 18 is engaged by a door 19 which when shut enables the tire to be completely enclosed within the case. This construction is of considerable advantage as it affords the spare tire complete shelter from the weather, dirt, grease, etc., and owing to the inconspicuous location of the case, its finished appearance may well be sacrificed for strength, and by providing a lock 21 for the door, theft of the tire may ordinarily be easily prevented.

By referring to the drawings it will be noted that the case lies directly over and adjacent the differential housing 22 of the rear axle, and since the case is secured to a portion of the automobile that is suspended by the springs 23, means must be provided to permit an unimpeded downward movement of the body 7 when it oscillates with respect to the running gear of the automobile. Formed in the bottom plate 9 of the case and being substantially vertically aligned with respect to the differential housing 22, is an aperture 24, which may be engaged by said housing when the body 7 is pressed downwardly. The aperture is preferably closed by a cover 26 formed of some strong dustproof flexible material, and means are provided which will normally hold the cover 26 in its upward position and yet permit the tire to be readily inserted into or withdrawn from the case when necessary. Pivoted to one side of the aperture 24 and engaging it, is an inwardly bent retaining member 27, that is adapted to normally press against the flexible cover 26 and retain it in the position shown in Figure 1 of the drawings. The retaining member 27 is held in its normal position by a spring 28 and a lateral extension 29 is preferably formed on the free end of the retaining member which arrests the upward movement thereof.

In the operation of the device the door 19 is unlocked and the tire is inserted into the case through the opening 18 thereof. As the tire passes over the aperture 24 the flexible cover 26 and retaining member 27 are forced downwardly until the tire lies practically entirely within the case whereby the latter members are released and are permitted to extend upwardly within the center of the tire. The door is then relocked and the body 7 may oscillate freely with respect to the running gear notwithstanding that a tire and tire case are interposed between them.

To withdraw a tire from the case it is simply necessary to unlock the door 19 and pull the tire out, the cover and member 27 being again forced downwardly by the tire until the tire passes from over the aperture.

I claim:

1. In an automobile having its frame and body yieldingly suspended above the differential housing of the rear axle for substantially vertical movement, a substantially horizontally disposed tire case secured to one of said suspended members and arranged between the rear wheels and directly above said differential housing and comprising a bottom plate provided with an aperture arranged to be engaged by said housing.

2. In an automobile frame, the combination with a pair of longitudinal side members extending across the rear axle, of a substantially horizontally disposed case constituting a cross brace secured to said side members directly above said axle, and including a bottom that presents a concaved area relative to and arranged to overlie the differential housing on said axle.

3. In an automobile having a differential housing, a frame including a pair of longitudinal side members, a tire case comprising top and bottom plates one of which is secured to said members to form a cross brace, a hinged plate forming the rear wall of said casing, said bottom plate having an opening vertically aligned with said housing, a flexible covering engaging said opening, and a spring arranged to normally retain said covering above said opening.

4. In an automobile frame, the combination with a pair of longitudinal side members extending across the rear axle, of a substantially horizontally disposed tire case overlying said axle and secured to said side members to form a cross brace, and a second cross member secured to said side members between their rear ends and said case and lying in a plane substantially lower than said case.

5. In an automobile having a differential housing and a pair of longitudinal frame members, a substantially horizontally disposed tire case arranged between said frame members and comprising top and bottom plates arranged to overlie said housing, said bottom plate being provided with an opening vertically aligned with said housing, and a yieldingly mounted covering engaging said opening.

6. In an automobile having a differential housing, a frame including a pair of longitudinal side members, a tire case comprising top and bottom plates one of which is secured to said members to form a cross brace, said case being arranged to open at its rear end to permit of the insertion or withdrawal of a tire, and a concaved area provided in said bottom plate vertically aligned with said housing.

7. In an automobile having a differential housing, a pair of longitudinal frame members, a tire case arranged to be opened at its rear end for the insertion of or withdrawal of a tire and comprising top and bottom plates one of which is secured to said members to form a cross brace, said bottom plate having an opening vertically aligned with respect to said housing, a flexible covering for said opening, and means for normally holding said covering pressed away from said housing.

In testimony whereof, I have hereunto set my hand at Oakland, California, this 5th day of January, 1920.

WILLIAM W. WHITTON.

In presence of—
L. L. M. SALSBURY,
J. B. GARDNER.